(12) United States Patent
Stude et al.

(10) Patent No.: US 12,095,066 B2
(45) Date of Patent: Sep. 17, 2024

(54) MULTI-LAYER THERMAL INSULATION ELEMENT FOR BATTERIES

(71) Applicant: H.K.O. ISOLIER- UND TEXTILTECHNIK GMBH, Oberhausen (DE)

(72) Inventors: Ulrich Stude, Rodeberg-Struth (DE); Carsten Stöckmann, Oberhausen (DE)

(73) Assignee: H.K.O. ISOLIER—UND TEXTILTECHNIK GMBH, Oberhausen (DE)

( * ) Notice: Subject to any disclaimer, the term of this patent is extended or adjusted under 35 U.S.C. 154(b) by 0 days.

(21) Appl. No.: 18/113,382

(22) Filed: Feb. 23, 2023

(65) Prior Publication Data

US 2023/0198051 A1  Jun. 22, 2023

Related U.S. Application Data

(63) Continuation of application No. 16/771,906, filed as application No. PCT/EP2018/085432 on Dec. 18, 2018, now Pat. No. 11,664,546.

(30) Foreign Application Priority Data

Dec. 21, 2017 (DE) .................. 10 2017 011 886.8
Jan. 19, 2018 (DE) .................. 10 2018 000 421.0

(51) Int. Cl.
*H01M 10/658* (2014.01)
*B32B 15/14* (2006.01)
(Continued)

(52) U.S. Cl.
CPC .......... *H01M 10/658* (2015.04); *B32B 15/14* (2013.01); *B32B 15/20* (2013.01); *H01M 50/124* (2021.01);
(Continued)

(58) Field of Classification Search
CPC . H01M 10/658; H01M 50/124; H01M 50/209
See application file for complete search history.

(56) References Cited

U.S. PATENT DOCUMENTS 6,551,951 B1  4/2003  Fay et al.
6,670,291 B1  12/2003 Tompkins et al.
(Continued)

FOREIGN PATENT DOCUMENTS

AT  518161 A4  8/2017
CN  101910702 A  12/2010
(Continued)

OTHER PUBLICATIONS

U.S. Appl. No. 18/038,584, filed May 24, 2023, Stude et al.
(Continued)

*Primary Examiner* — Olatunji A Godo
(74) *Attorney, Agent, or Firm* — Jason H. Vick; Sheridan Ross, PC

(57) ABSTRACT

A multi-layer heat insulation element for thermal insulation of a battery is proposed, with a first cover layer, with a second cover layer and with a compressible and/or pliable intermediate ply arranged between the cover layers, which has at least one heat-resistant fibre layer, wherein the fibre layer is formed from a needled nonwoven and/or wherein the cover layers are flexurally weak and the heat insulation element as a whole is compressible and flexibly pliable.

20 Claims, 6 Drawing Sheets

Figure 1A:
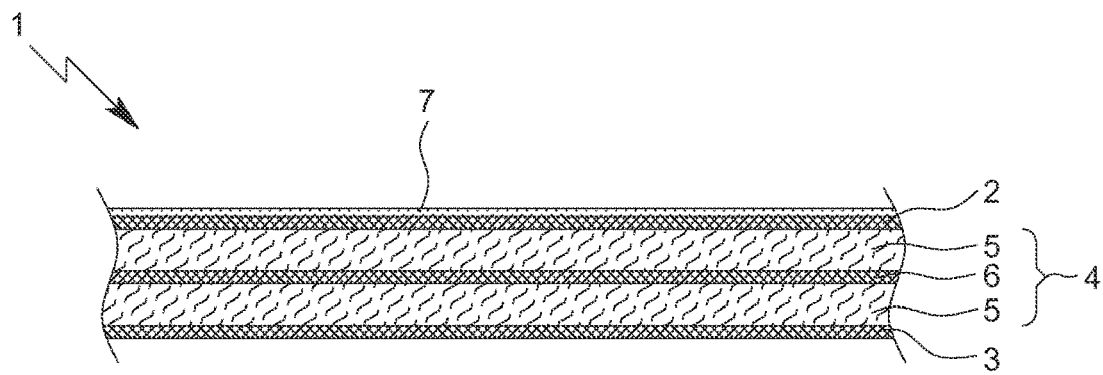

(51) Int. Cl.
*B32B 15/20* (2006.01)
*H01M 50/124* (2021.01)
*H01M 50/209* (2021.01)

(52) U.S. Cl.
CPC ..... *H01M 50/209* (2021.01); *B32B 2262/101* (2013.01); *B32B 2307/304* (2013.01); *B32B 2307/3065* (2013.01); *B32B 2457/10* (2013.01); *H01M 2220/20* (2013.01)

(56) References Cited

U.S. PATENT DOCUMENTS

| | | | |
|---|---|---|---|
| 8,541,126 | B2 | 9/2013 | Hermann et al. |
| 10,476,102 | B2 | 11/2019 | Fujii et al. |
| 11,664,546 | B2 * | 5/2023 | Stude .............. F16L 59/08 429/120 |
| 2003/0170418 | A1 | 9/2003 | Mormont et al. |
| 2006/0068278 | A1 | 3/2006 | Bloom et al. |
| 2008/0009212 | A1 | 1/2008 | Levine |
| 2008/0182097 | A1 | 7/2008 | Mochizuki et al. |
| 2011/0159340 | A1 | 6/2011 | Hu et al. |
| 2011/0192564 | A1 | 8/2011 | Mommer et al. |
| 2011/0195291 | A1 | 8/2011 | Yokoyama et al. |
| 2012/0219839 | A1 | 8/2012 | Kritzer et al. |
| 2015/0030804 | A1 | 1/2015 | Baser |
| 2016/0099442 | A1 | 4/2016 | Kanayama |
| 2017/0301965 | A1 | 10/2017 | Kato et al. |
| 2018/0309107 | A1 | 10/2018 | Widener |
| 2019/0207188 | A1 | 7/2019 | Miller et al. |
| 2020/0062920 | A1 | 2/2020 | O'Neil et al. |
| 2020/0263336 | A1 * | 8/2020 | Wu .............. B29C 43/24 |
| 2021/0074960 | A1 | 3/2021 | Stude et al. |
| 2021/0260850 | A1 | 8/2021 | Jin et al. |
| 2022/0069402 | A1 | 3/2022 | Winter et al. |
| 2023/0035826 | A1 | 2/2023 | Stude et al. |

FOREIGN PATENT DOCUMENTS

| | | |
|---|---|---|
| CN | 202782015 A | 3/2013 |
| CN | 103510670 A | 1/2014 |
| CN | 104169077 A | 11/2014 |
| CN | 105133189 A | 12/2015 |
| CN | 105489965 A | 4/2016 |
| CN | 107914428 A | 4/2018 |
| CN | 209822690 U | 12/2019 |
| CN | 110641101 A | 1/2020 |
| DE | 621613 C | 11/1935 |
| DE | 3242900 A1 | 9/1983 |
| DE | 3219506 A1 | 12/1983 |
| DE | 3802322 A1 | 8/1989 |
| DE | 10134145 A1 | 2/2003 |
| DE | 60105156 T2 | 7/2005 |
| DE | 60122228 T2 | 12/2006 |
| DE | 60124578 T2 | 9/2007 |
| DE | 102007032431 A1 | 1/2008 |
| DE | 202010017454 U1 | 1/2012 |
| EP | 1326745 B1 | 11/2006 |
| EP | 2090470 A1 | 8/2009 |
| EP | 3142166 A1 | 3/2017 |
| EP | 3269540 A1 | 1/2018 |
| EP | 3395872 A1 | 10/2018 |
| GB | 2121159 A | 12/1983 |
| GB | 2568688 A | 5/2019 |
| JP | 2002-339217 A | 11/2002 |
| JP | 5259908 B2 | 8/2013 |
| JP | 2015-042448 A | 3/2015 |
| JP | 6233957 B2 | 11/2017 |
| WO | WO 2004/064082 A2 | 7/2004 |
| WO | WO 2016/092839 A1 | 6/2016 |
| WO | WO 2017/208952 A1 | 12/2017 |
| WO | WO 2019/090659 A1 | 5/2019 |
| WO | WO 2019/121641 A1 | 6/2019 |
| WO | WO 2020/070275 A1 | 4/2020 |
| WO | WO 2021/019495 A1 | 2/2021 |
| WO | WO 2021/022130 A1 | 2/2021 |
| WO | WO 2021/140167 A1 | 7/2021 |
| WO | WO 2022/117500 A1 | 6/2022 |
| WO | WO 2022/253631 A1 | 12/2022 |

OTHER PUBLICATIONS

U.S. Appl. No. 18/564,907, filed Nov. 28, 2023, Stöckmann et al.
Fujii, Mikiya "The Introduction of Ceramic Fiber Products as Thermal Insulation and the Recent Trend for Them" (Includes Translation) Dec. 31, 2008.
Nanjo, Naoshi "Introduction to FRP Constituent Materials: Chapter 2—Constituent Materials and Types—Glass Fiber—" (Includes Translation) Journal of the Japan Society for Composite Materials; 33,4; pp. 141-149; Dec. 31, 2007.
Excerpt of the book "Vliesstoffe—Rohstoffe, Herstellung, Anwendung, Eigenschaften, Prüfung" Including Machine Translation; Edited by Hilmar Fuchs and Wilhelm Albrecht; Wiley-VCH; pp. 42-44 and 159; Jun. 2009.
International Search Report for International Application No. PCT/EP2018/085432, dated May 22, 2019.
Written Opinion for International Application No. PCT/EP2018/085432, dated May 22, 2019.
International Preliminary Report on Patentability for International Application No. PCT/EP2018/085432, dated Jul. 2, 2020.
Chinese Office Action for corresponding Chinese Patent Application No. 201880082648.4, dated May 25, 2022.
Chinese Office Action (Including Translation) for corresponding Chinese Patent Application No. 201880082648.4, dated Dec. 12, 2022.
Notice of Reasons for Refusal (Including Translation) for corresponding Japanese Patent Application No. 2020-535106, dated Oct. 31, 2022.
International Search Report for International Application No. PCT/EP2021/050208, dated Mar. 24, 2021.
Written Opinion for International Application No. PCT/EP2021/050208, dated Mar. 24, 2021.
International Preliminary Report on Patentability for International Application No. PCT/EP2021/050208, dated Jul. 21, 2022.
Office Action for U.S. Appl. No. 16/771,906, dated Mar. 31, 2022.
Office Action for U.S. Appl. No. 16/771,906, dated Sep. 29, 2022.
Office Action for U.S. Appl. No. 16/771,906, dated Jan. 26, 2023.

\* cited by examiner

MULTI-LAYER THERMAL INSULATION ELEMENT FOR BATTERIES

CROSS REFERENCE TO RELATED APPLICATIONS

This application is a Continuation of U.S. patent application Ser. No. 16/771,906, filed Jun. 11, 2020, now U.S. Pat. No. 11,664,546, which is a National Stage Application under 35 U.S.C. 371 of PCT Application No. PCT/EP2018/085432 having an international filing date of 18 Dec. 2018, which designated the United States, which PCT application claimed the benefit of German Application No. 10 2017 011 886.8, filed 21 Dec. 2017, and German Application No. 10 2018 000 421.0, filed 19 Jan. 2018, each of which are incorporated herein by reference in their entirety.

The present invention concerns a multi-layer heat insulation element for thermal insulation of a battery, a battery with a multi-layer heat insulation element, and a use of a multi-layer heat insulation element according to the claims as appended hereto.

In the present invention, the term "heat insulation element" is preferably to be understood as a flat component consisting of a layered structure, in particular a layer package, which is designed and/or used for the thermal insulation of a battery. In particular, the heat insulation element is configured to reduce and/or delay the release of heat to the environment, in particular a vehicle interior, and/or to contain and/or reduce and/or delay the spread of heat in the battery in the event of uncontrolled and/or excessive heat development in the battery.

In the present invention, the term "battery" is to be understood as meaning, in particular, a rechargeable storage element and/or secondary element for providing electrical energy by converting chemical energy. The battery is preferably composed of several interconnected accumulator cells and/or cell blocks, i.e. battery cells.

In particular, the battery is configured as a traction battery and/or for the drive of electric vehicles and/or as a lithium-ion battery. Here, reliable and/or effective thermal insulation is important in order to protect the vehicle occupants in the event of the battery overheating, for example as a result of a traffic accident, at least until the arrival of rescue services.

Due to their chemical composition, lithium-ion batteries in particular exhibit comparatively high instability. If a local short-circuit of the internal electrodes in a battery cell occurs, for example due to contamination of the separator separating the electrodes by trapped foreign particles and/or mechanical action or damage, the strong short-circuit current heats the battery cell up to 800° C. in a short time, sometimes up to 1300° C. This process is known as thermal runaway. The thermal runaway of one battery cell can easily and/or quickly spread to other, adjacent battery cells, especially since the separator loses stability at relatively low temperatures, for example above 120° C., and short circuits can therefore quickly occur in adjacent battery cells. This leads to an unstoppable chain reaction, wherein the energy stored in the battery is released in a short time, usually explosively and with the release of fragments.

Against this background, it is desirable to keep a battery cell located adjacent to a battery cell running away or overheating as long as possible below a certain limit temperature, preferably 120° C., in particular 80° C. Above 80° C. the aging process of the battery cell is considerably accelerated and above 120° C. the separator in the battery cell often begins to melt, accompanied by irreversible damage and/or short circuits.

Likewise, there is a high demand for efficient and/or long-lasting heat protection of adjacent areas and/or rooms, especially vehicle interiors, against uncontrolled heat development in the battery. In particular, occupants and/or objects should be protected from heat until rescue and/or recovery measures have been fully completed.

DE 101 34 145 A1 concerns a fire-retardant battery housing. The battery housing contains a thermally active material, for example aluminium silicate or gibbsite, which transforms above a certain temperature, whereby further supplied thermal energy is consumed for the progressive transformation and thus a rise in temperature is at least slowed down. In this case, effective containment of thermal cycling is not or at best only very difficult to achieve, since it is not possible to arrange the protective material between battery cells, the conversion can lead to mechanical stress or destruction of the battery cells, and there is a risk that the thermally active material will burst and thus lose its thermal insulation function prematurely.

AT 518 161 A4 concerns a battery with a plurality of battery cells, wherein at least two adjacent battery cells are thermally insulated from each other by a protective material. Above a predetermined temperature, the protective material expands and the battery cells insulated from one another are pushed away from one another by the increase in volume of the protective material which expands under the effect of temperature, the battery cells thus being thermally further separated and/or insulated from one another. The disadvantage is that the increase in volume of the protective material—in particular in addition to the increase in pressure due to the heat development—results in an inflation pressure within the battery, which correspondingly increases the risk of the battery bursting and/or of damage to and destruction of battery cells.

From U.S. Pat. No. 8,541,126 B2 a heat insulation element for the thermal insulation of a battery is known. The heat insulation element is arranged between two adjacent battery cells. The heat insulation element has a layered structure with an interlayer arranged between two cover layers. The interlayer has a higher thermal conductivity than the cover layers. The cover layers can be designed as a fibre layer of ceramic or refractory fibres. A disadvantage is that the heat insulation element is brittle due to the formation of the fibres and can burst and/or fragment even at low pressure loads. This is not only associated with a significant impairment or even loss of the thermal insulation function, but also leads to damage to adjacent and/or neighbouring battery cells and ultimately increases the risk of explosion.

EP 3 142 166 A1 concerns a heat insulation element with a rigid mica plate and a compressible, short-fibre and/or refractory fibre layer, which are alternately arranged and/or stacked on top of each other. The disadvantage is that a flexible adaptation and/or shaping, especially for installation in a battery, is not possible. Also, the heat insulation element with its brittle mica plates and its short-fibred fibre mat can easily burst and/or fragment as a result of an uncontrolled heat development and the associated pressure increase, leading to damage to the surroundings and/or prematurely losing its thermal insulation function. Finally, the high mass per unit area is disadvantageous especially for vehicles.

It is an object of the present invention to provide a multi-layer heat insulation element for the thermal insulation of a battery, a battery with such a heat insulation element and a use of the heat insulation element, wherein efficient heat insulation and/or a robust and/or resistant construction and/or flexible and/or easy assembly and/or integration into the battery is enabled and/or supported.

The above object is solved by a multi-layer heat insulation element, by a battery or by a use according to the claims as appended hereto. Advantageous further developments are the subject of the subclaims.

A first aspect of the present invention is that the fibre layer is formed of long fibres of more than 30 mm in length and/or of a needled or bonded nonwoven. The long fibres and/or the needling and/or bonding of the fibre layer significantly increase the mechanical resistance compared to another fibre layer. Thus, the fibre layer according to the invention is on the one hand stretchable and pressure-elastic, which enables the absorption of high pressure forces. At the same time, the fibre layer has a high thermal insulation capacity, as the intertwined fibres efficiently reduce the passage of thermal energy through the fibre layer. This is particularly advantageous in the event of uncontrolled heat generation within the battery, for example when a thermal runaway of a battery cell occurs, as this significantly delays the complete destruction or explosion of the battery. Finally, needled nonwovens have a low mass per unit area, which facilitates handling.

Preferably, the fibre layer is made of needled and/or bonded glass fibres or silicate fibres or a mixture thereof.

Particularly preferably, the fibres of the fibre layer have a length of at least 40 mm, preferably at least 50 mm, in particular essentially 50 to 60 mm. This allows a particularly high pressure and tear resistance of the fibre layer.

In particular, the fibres have an average diameter of at least 4 preferably at least 5 in particular 6 to 15 µm.

The fibre layer is particularly preferred to be binder-free and/or free of melt beads.

Preferably, the fibre layer and intermediate ply, respectively, has a mass per unit area of less than 1000 g/m², preferably less than 800 g/m², in particular less than 600 g/m², and/or more than 150 g/m², preferably more than 200 g/m², in particular more than 300 or 400 g/m². This enables easy handling.

According to a second aspect of the present invention which can also be realised independently, the cover layers are designed to be flexurally weak and/or flexurally soft in order to make the heat insulation element both compressible and flexible and/or elastically pliable. This enables a flexible adaptation to different installation situations and/or a better adaptation in case of high loads, e.g. bursting of a battery cell, so that the heat insulation element is more resistant to destruction and/or loss of its heat insulation function. Finally, the release of fragments is significantly reduced.

Preferably, at least one cover layer is designed to be liquid-tight, preferably waterproof. In addition, one of the cover layers, preferably both cover layers, is/are designed to be water-repellent and/or gas-tight. In this way, the intermediate ply and/or fibre layer is efficiently protected, thus ensuring efficient thermal insulation even in humid and/or gaseous environments.

Preferably, at least one cover layer is designed as a heat-resistant metal layer, preferably aluminium layer.

Alternatively, at least one cover layer may be formed as a heat-resistant plastic layer, preferably polyimide layer, or as a heat-resistant woven fabric layer, preferably glass fabric layer.

A cover layer designed as a metal, plastic or woven fabric layer is preferably less than 100 µm, particularly preferably less than 80 µm, in particular between 20 and 50 µm, thick.

According to a preferred design, the heat insulation element has a layer of a woven fabric. The woven fabric can form at least one cover layer and/or an additional layer. Preferably, the woven fabric is arranged on the outside of the heat insulation element. The woven fabric may comprise or consist of metal fibres, in particular stainless steel fibres and/or aluminium fibres, glass fibres, carbon fibres, silicate fibres and/or a mixture thereof. In particular, the mechanical stability of the heat insulation element can be significantly increased and/or improved by using a woven fabric as a cover layer. This is particularly advantageous as mechanical protection in the event of a battery cell explosion.

Preferably, at least one cover layer and/or the heat insulation element is made air-permeable and/or gas-permeable, for example if the cover layer comprises the woven fabric or is formed by it. This may reduce the risk of explosion of a battery enclosed and/or surrounded by one or more heat insulation elements, as in this way explosive gases may be discharged through the cover layer.

Particularly preferably, at least one cover layer or both cover layers is/are designed as heat-resistant mica layer, preferably mica paper layer or mica board. In particular, a cover layer formed as a mica layer is less than 3 mm, preferably less than 2 mm, in particular less than 1 mm, especially preferably between 0.05 and 0.15 mm, thick. This allows a high heat resistance and at the same time flexibility and/or pliability.

Particularly preferably, the first cover layer is designed as a high-temperature resistant mica layer, preferably mica paper layer, whereas the second cover layer is designed as an aluminium layer, preferably aluminium foil. Alternatively, the second cover layer can also be designed as a plastic layer, preferably polyimide layer. The above-mentioned material pairing allows the thermal insulation to be optimised. This has been confirmed by tests.

Particularly preferably, the intermediate ply comprises two fibre layers, in particular of needled nonwoven, the fibre layers being separated from each other by a heat-resistant and/or flexurally weak interlayer. The multi-layer structure thus formed (two or more heat insulation and/or fibre layers separated by an interlayer) allows the heat insulation properties of the intermediate ply to be further improved, since the interlayer within the intermediate ply forms a thermal barrier between the fibre layers and thus further reduces and/or limits the spread of heat through the intermediate ply and/or the heat insulation element. This has also been confirmed in tests.

Particularly preferably, the interlayer is designed as a high temperature resistant plastic layer, preferably polyimide film, or aluminium layer, in particular aluminium foil.

The interlayer is preferably less than 100 µm, especially preferably less than 80 µm, in particular between 20 and 50 µm, thick.

Preferably, at least one cover layer and/or the interlayer has a dielectric strength of more than 1 kV/mm, preferably more than 1.5 kV/mm, in particular more than 2 kV/mm. This avoids and/or delays the formation of electric arcs or sparks.

In particular, the heat insulation element—preferably when installed—is less than 7 mm, preferably less than 6 mm, in particular between 2 and 3 mm, thick. This allows a flexible and easy installation in the battery, even in narrow installation gaps.

In particular, the heat insulation element has an adhesive layer on at least one flat side at least in sections or is self-adhesive at least in sections on one flat side. This allows the heat insulation element to be easily arranged and/or attached to or in the battery and/or further heat insulation elements.

Preferably, the cover layers and the intermediate ply are glued together or otherwise joined to form a bond. In this way, a mechanically stable layered composite is realised.

In particular, the heat insulation element has a dielectric strength of more than 20 kV/mm, preferably more than 30 kV/mm, in particular of 40 to 70 kV/mm.

Preferably, the heat insulation element has a mass per unit area of less than 1500 g/m$^2$, preferably less than 1300 g/m$^2$, in particular less than 1000 g/m$^2$, and/or more than 150 g/m$^2$, preferably more than 200 g/m$^2$, in particular more than 300 or 400 g/m$^2$.

The thermal conductivity of the heat insulation element at 25° C. room temperature is less than 0.1 W/mK, preferably less than 0.08 W/mK, in particular less than 0.04 W/mK.

A battery, preferably a lithium-ion battery, according to the proposal, in particular in the form of a traction battery for an electric vehicle, comprises a housing and at least one multi-layer heat insulation element according to the proposal, which is arranged in and/or on the housing for thermal insulation. This results in corresponding advantages.

Preferably, the heat insulation element closes and/or insulates the battery or battery cells or the housing on the outside or inside on the top surface at least partially, preferably completely or over the entire surface. This allows effective heat insulation of the battery towards the top and/or towards an area located above and/or adjacent to the battery, in particular a vehicle interior of a vehicle. In this way, persons, occupants and/or objects in the area and/or room are protected effectively and/or for a sufficiently long time—i.e. until rescue and/or recovery measures have been completed—from uncontrolled heat development in the battery.

Alternatively or additionally, the heat insulation element can be placed between two adjacent battery cells in the housing and thermally insulate them from each other. In this way, flashing over of a thermal runaway from one battery cell to the next and/or adjacent battery cell is effectively delayed and/or contained, thus preventing or at least significantly delaying the explosive release of heat and/or fragments from the battery.

In particular, the heat insulation element is attached and/or fixed to or in a housing lid and/or housing top part of the housing, preferably glued on.

The heat insulation element can be attached, especially over its entire surface, to an inner side of the housing or housing lid facing the housing interior and preferably on top in the installed state. In this way, effective top-side heat insulation is made possible.

Alternatively or additionally, the heat insulation element and/or another heat insulation element may be attached or aligned transversely and/or perpendicularly to the inside, in particular in such a way that the heat insulation element can be easily inserted between two adjacent battery cells.

Alternatively or additionally, the heat insulation element and/or another heat insulation element can be arranged on the inside on a floor and/or the underside of the housing interior. In this way it is possible to protect the battery against heat acting on the battery from the underside, for example in the event of a fuel fire on the road.

Alternatively or in addition, the heat insulation element and/or another heat insulation element can be arranged on the inside of a side wall of the housing and/or a side wall of the interior.

Preferably, at least two heat insulation elements are arranged in the battery, wherein at least one first heat insulation element insulates the housing and/or the housing interior at the top and at least one second heat insulation element is arranged between adjacent battery cells. In this way, corresponding advantages, which can in principle also be realised independently of one another, can be realised simultaneously, i.e. top-side heat insulation of the battery on the one hand and delay and/or reduction of heat propagation between adjacent battery cells, packs or modules on the other.

In particular, the second heat insulation element is attached transversely and/or vertically to the first heat insulation element, preferably glued, sewn or otherwise firmly connected.

In the case of a battery according to the proposal, it is particularly advantageous if the heat insulation element has at least one cover layer and/or additional layer of a woven fabric, preferably metal mesh, in particular wire mesh of stainless steel. As mentioned above, this may allow explosive gases to escape through the cover layer, thus reducing the risk of the battery exploding.

In addition, a cover layer or additional layer of woven fabric preferably offers high mechanical stability, so that passengers in the vehicle interior can be effectively protected from fragments in the event of a battery explosion.

It is also possible that a filter function for explosive and/or toxic and/or harmful gases is provided by the woven fabric, so that passengers in the vehicle interior are protected from such gases. Preferably, the woven fabric is designed in such a way that at least some of the gases are separated at the woven fabric. This will reduce the risks to humans resulting from such gases and/or exhaust gases.

In general, it should be noted that the proposed aspects according to the present invention improve and/or simplify the thermal insulation and fire protection of the passenger compartment of batteries, especially for electric vehicles. In particular, the proposed heat insulation element makes possible very effective heat insulation between the battery on the one hand and a vehicle interior, preferably located above and/or adjacent to the battery, on the other. Alternatively or additionally, a transfer of heat and/or the thermal runaway of a battery cell to adjacent battery cells is delayed and/or contained, thus preventing or at least significantly delaying the destruction and/or explosion of the battery. In this way, sufficient time is provided for rescue and/or recovery, within which the occupants are adequately protected from the uncontrolled heat development in the battery.

Figure 1B:
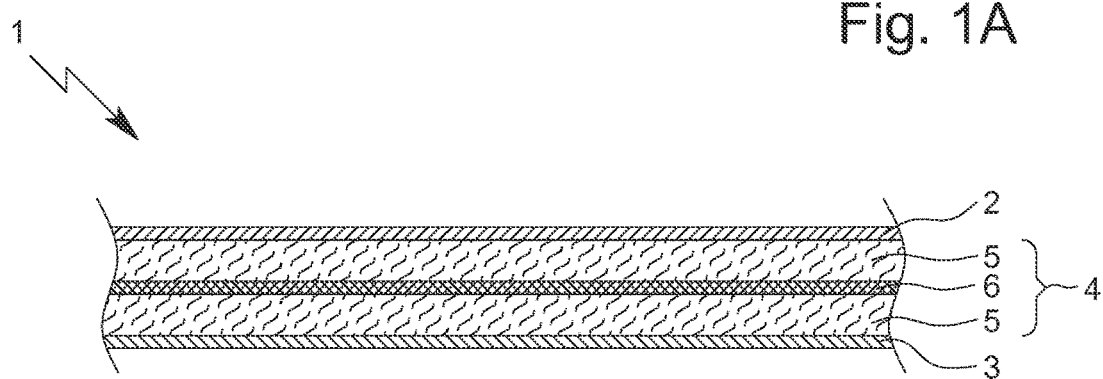
Figure 1C:
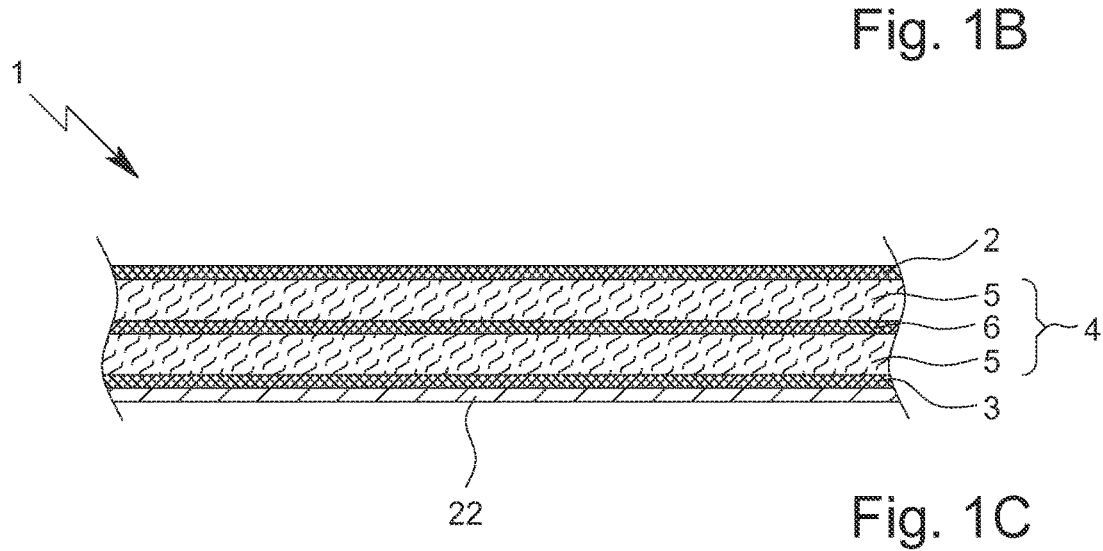
Figure 1D:
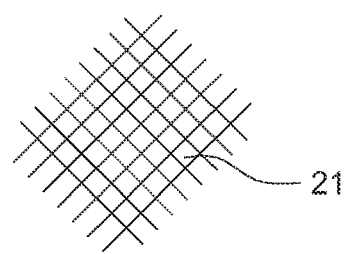
Figure 2:
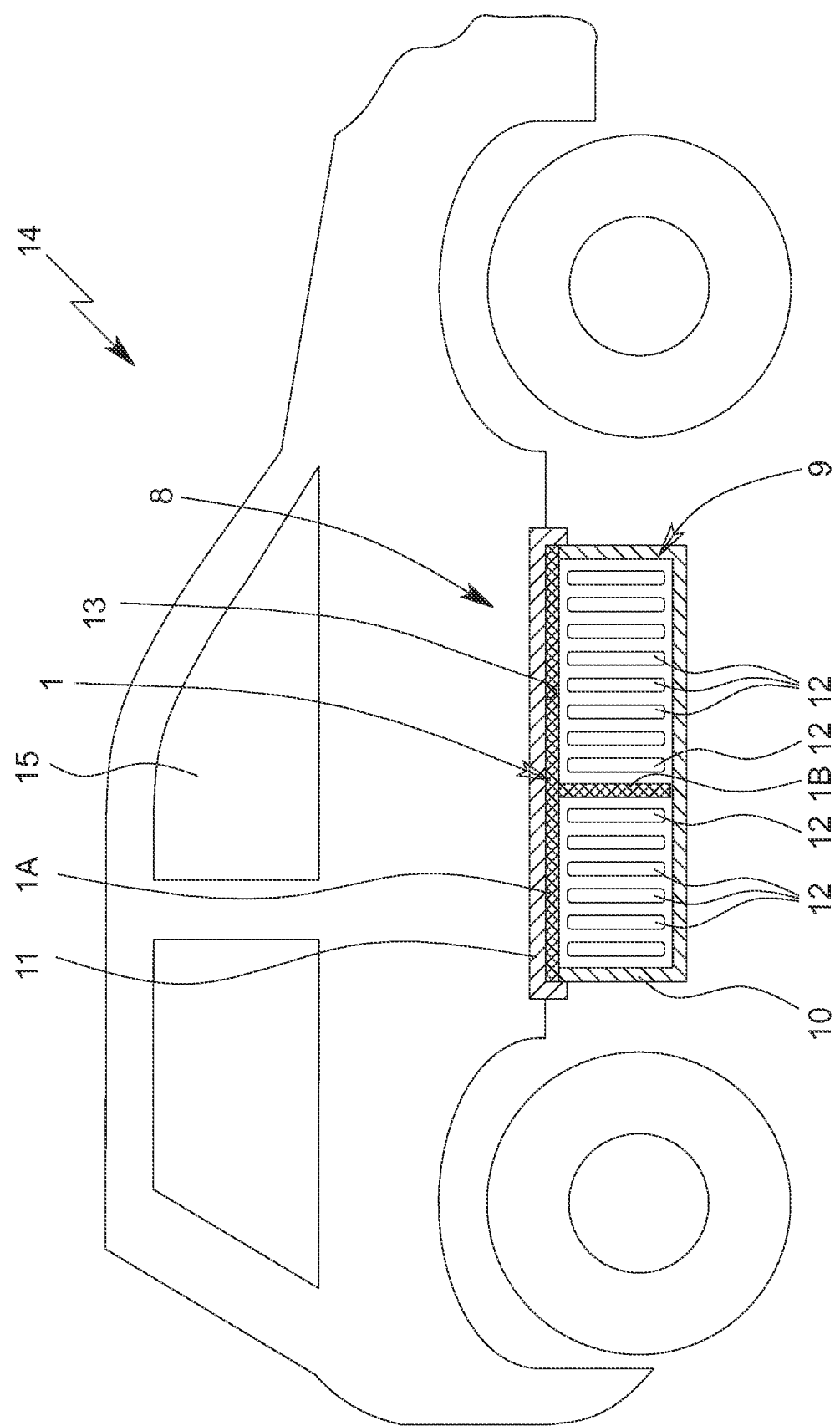
Figure 3:
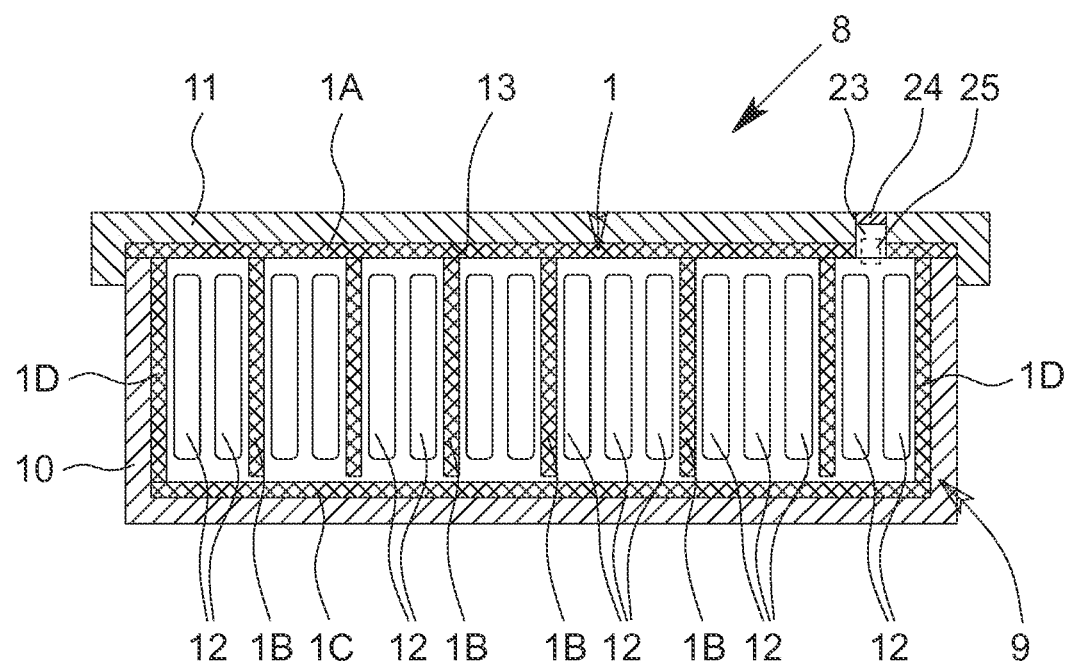
Figure 4:
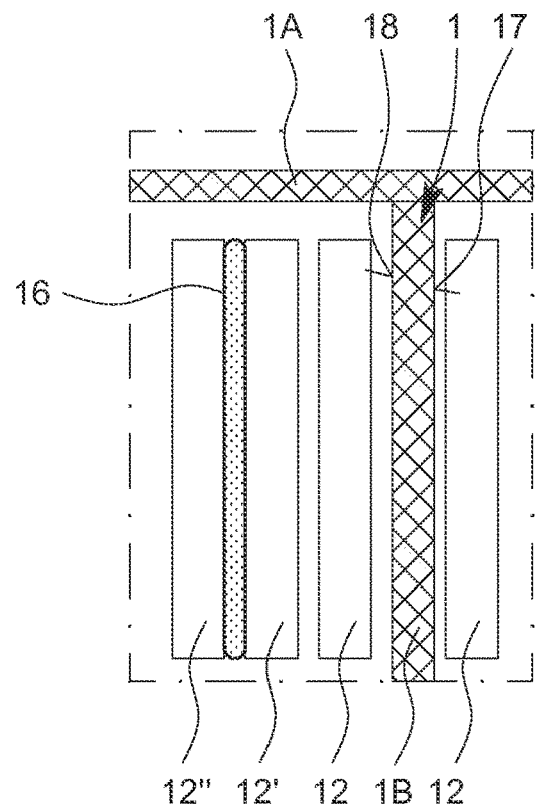
Figure 5:
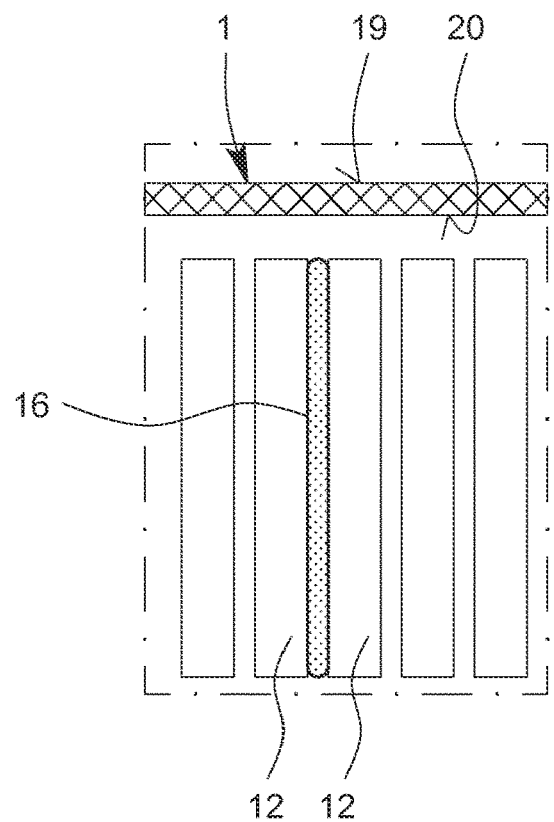
Figure 6:
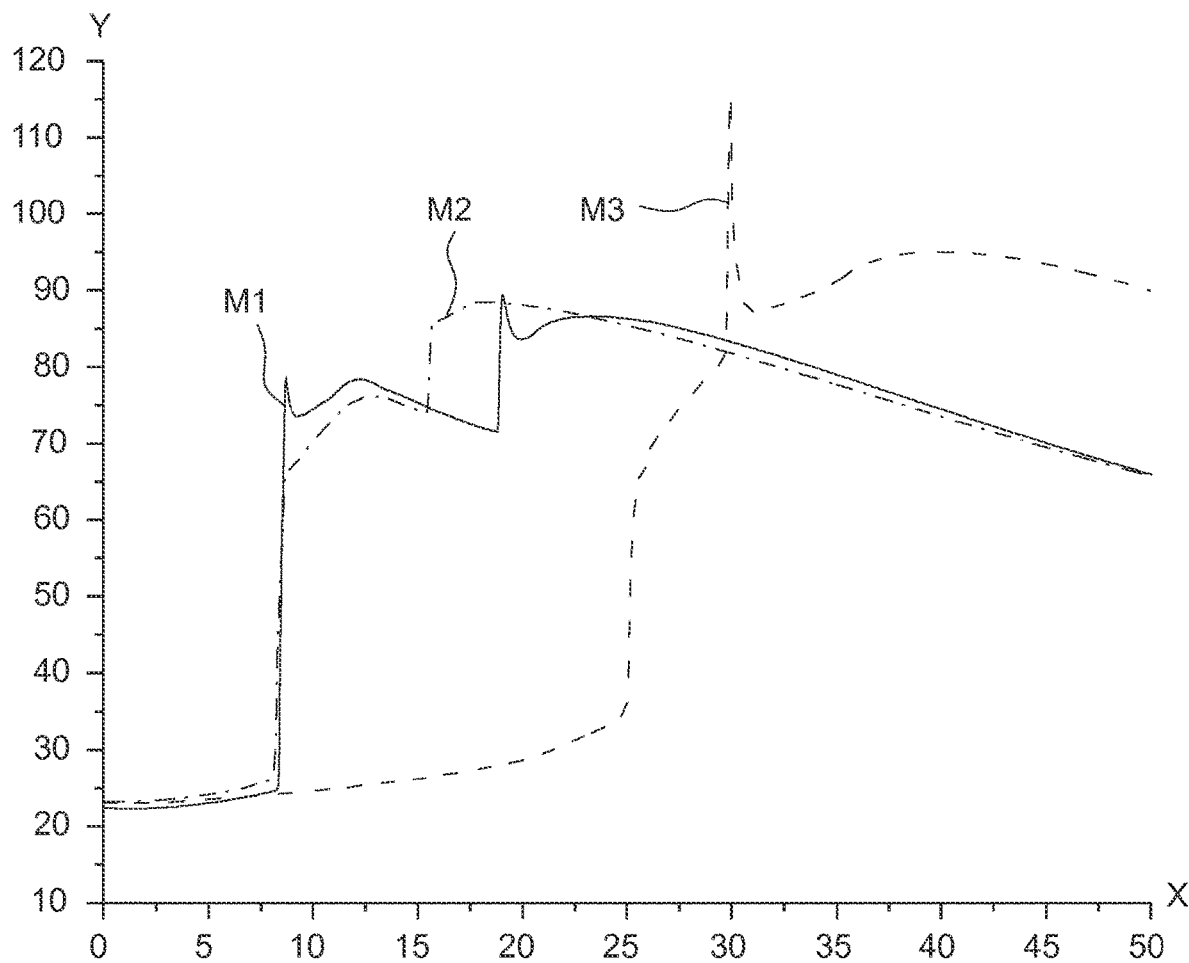
Figure 7:
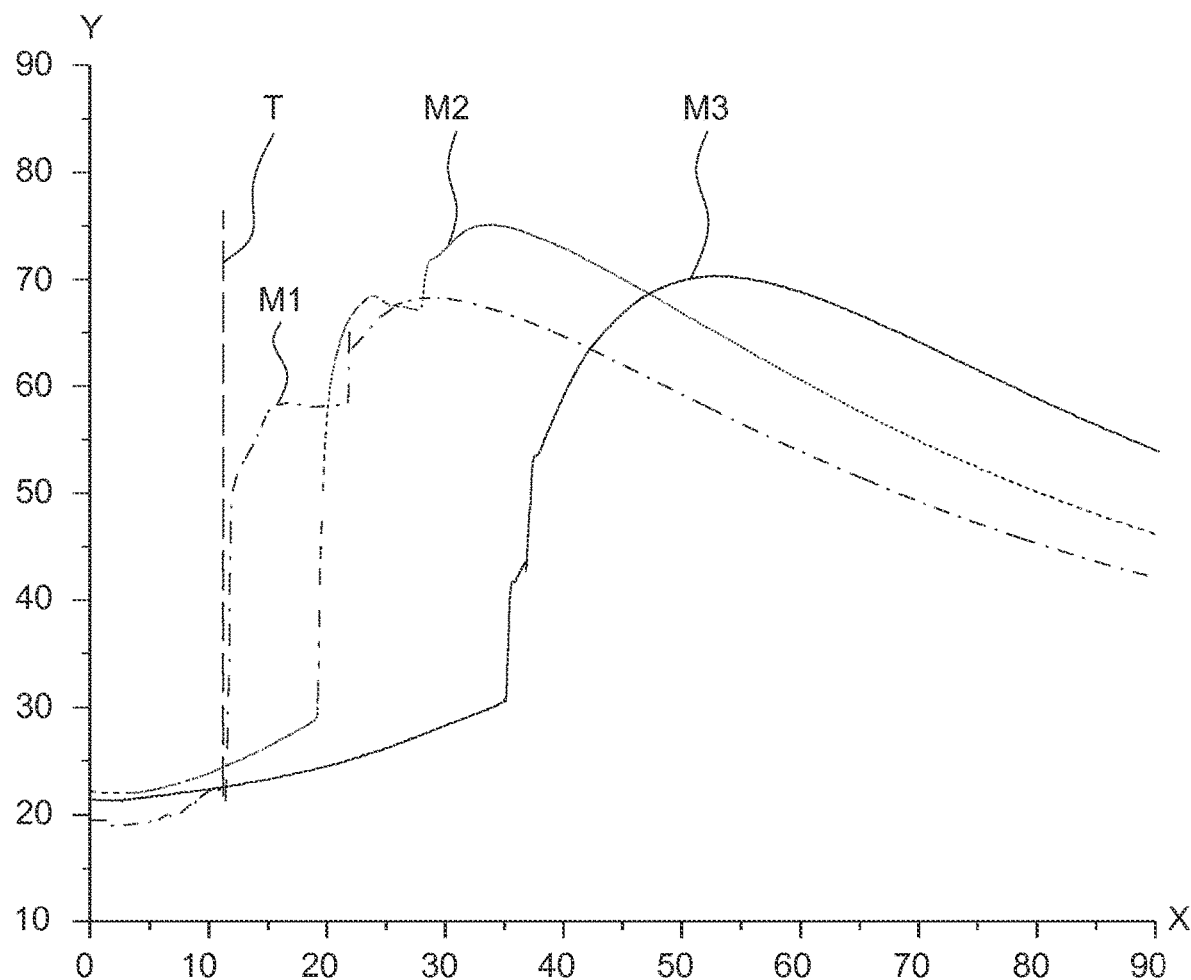

The above-mentioned aspects and features of the present invention as well as the aspects and features of the present invention resulting from the claims and the following description can basically be realised independently of each other, but also in any combination and/or sequence. Additional advantages, features, properties and aspects of the present invention result from the claims and the following description of preferred embodiments based on the drawing. It shows:

FIG. 1A a schematic section of a proposed multi-layer heat insulation element for thermal insulation;

FIG. 1B a schematic section of a multi-layer heat insulation element according to another embodiment;

FIG. 1C a schematic section of a proposed heat insulation element according to another further embodiment;

FIG. 1D a schematic representation of a woven fabric;

FIG. 2 a schematic section of a battery with heat insulation elements arranged therein, which is arranged and/or installed in a schematically indicated vehicle;

FIG. 3 a schematic section of a battery with an ordered heat insulation element according to a further embodiment;

FIG. 4 a first experimental setup for carrying out temperature measurements on proposed heat insulation elements;

FIG. 5 a second experimental setup for carrying out temperature measurements on proposed heat insulation elements;

FIG. 6 a first temperature diagram, measured on a proposed heat insulation element with a first layer structure; and FIG. 7 a second temperature diagram, measured on a proposed heat insulation element with a second layer structure.

FIG. 1A shows in a schematic, not to scale sectional view a multi-layer heat insulation element 1 according to the proposal. FIGS. 1B and 1C show in a likewise schematic, not to scale sectional view further embodiments of the multi-layer heat insulation element 1 according to the proposal. The embodiments shown are similar to each other and can also be combined with each other as desired. In particular, the different FIGS. 1A, 1B and 1C serve only to highlight different preferred aspects.

The heat insulation element 1 is in particular designed as a flat layer package.

The heat insulation element 1 is in particular compressible and at the same time pliable.

The term "pliable" is preferably understood to mean a sufficiently low bending stiffness of the heat insulation element 1, wherein the bending stiffness is a measure of the resistance of an acting force to bending deformation for a component and/or the heat insulation element 1. The bending stiffness is preferably determined according to ISO 5628 2493. For this purpose, a plate-shaped heat insulation element 1 with a certain dimension, for example with a thickness of 6 mm and a size of 60 mm×40 mm, is clamped in a rotatable clamping device. The free end of the heat insulation element 1 touches a sensor of a load cell, via which a corresponding contact force is recorded when the clamping device is rotated. In particular, the sensor contacts the free end of the heat insulation element 1 at a distance of 50 mm from the clamping point. The bending stiffness is determined in particular by the force measured at the sensor when the heat insulation element is bent by 15°. Preferably, the heat insulation element 1 has a bending stiffness determined in this way of less than 10 N, preferably less than 5 N, in particular less than 1 N.

The term "compressible" is preferably understood to mean a sufficiently low compression hardness of the heat insulation element 1, the compression hardness representing a pressure required to compress a test specimen and/or the heat insulation element 1 by 40% of its original thickness. The compression hardness is preferably determined in accordance with DIN EN ISO 3386, using a plate-shaped heat insulation element 1 with a thickness of 5 mm and a size of 300 mm×200 mm as the test specimen and an aluminium plate with a thickness of 20 mm and a size of 190×80 mm as the indenter. Preferably, the heat insulation element 1 has a compression hardness determined in this way of less than 40 kPa, preferably less than 30 kPa, in particular less than 20 kPa.

The heat insulation element 1 is especially configured for the thermal insulation of a battery 8 shown in FIG. 2. A preferred structure of battery 8 and a preferred arrangement of heat insulation elements 1A, 1B in battery 8 will be discussed later.

The heat insulation element 1 has a first cover layer 2 and a second cover layer 3. The cover layers 2, 3 each form in particular one (outer) flat side of the heat insulation element 1.

Preferably, a compressible and/or pliable intermediate ply 4 is arranged between the cover layers 2, 3. The intermediate ply 4 has at least one fibre layer 5—in the example shown two or more fibre layers 5.

One or each fibre layer 5 is preferably formed from a needled and/or bonded nonwoven. For the purposes of the present invention, the term "needled nonwoven" is preferably to be understood as a textile fabric, the fibres of which are randomly intertwined and thereby bonded by dry needling and/or needling without binder and/or melting beads.

The fibre layers 5 are in particular made of glass fibres or silicate fibres or a mixture thereof. For example, glass fibres, in particular of E-, ECR- or R-glass or mixtures thereof, and/or other heat-resistant fibres may be used.

The fibres preferably have an average diameter of at least 4 in particular at least 6 and most preferably essentially 8 to 16 µm.

The length of the fibres is preferably more than 30 mm, preferably more than 40 mm, in particular essentially 50 to 60 mm. In principle, however, the length of the fibres can also be greater, for example up to about 120 mm.

Preferably, the fibre layers 5 are free of binding agents and/or melting beads.

Preferably, the mass per unit area of the fibre layers 5 and/or the intermediate ply 4 is less than 1000 g/m$^2$, preferably less than 800 g/m$^2$, in particular less than 600 g/m$^2$, and/or more than 150 g/m$^2$, preferably more than 200 g/m$^2$, in particular more than 300 or 400 g/m$^2$.

Preferably, the mass per unit area of the heat insulation element 1 is less than 1500 g/m$^2$, preferably less than 1300 g/m$^2$, in particular less than 1000 g/m$^2$, and/or more than 150 g/m$^2$, preferably more than 200 g/m2$^2$ in particular more than 300 or 400 g/m$^2$.

Preferably, the fibre layers 5 of the intermediate ply 4 are separated from each other by an interlayer 6. The interlayer 6 is in particular formed by a heat-resistant metal layer, preferably aluminium layer. However, the interlayer 6 may also be formed by a heat-resistant plastic layer, preferably polyimide layer.

The heat insulation element 1 can also have several interlayers 6 and correspondingly several fibre layers 5, in particular wherein two fibre layers 5 are separated from each other by an interlayer 6.

The cover layers 2, 3 are preferably designed to be flexurally weak, i.e. easily pliable and/or flexible. A "flexurally weak" cover layer 2, 3 in the sense of the present invention is preferably paper-like, fabric-like or foil-like and/or has a thickness of less than 2 mm, in particular less than 1 mm. Especially preferably, the thickness of the cover layer 2, 3 is more than 0.05 mm and/or less than 0.15 mm. This makes the entire heat insulation element 1 compressible and flexible, the compressibility being at least essentially due to the compressible design of the intermediate ply 4.

The cover layers 2 and 3, intermediate ply 4, fibre layers 5 and/or the heat insulation element 1 is or are preferably heat-resistant, in particular up to at least 200° C., particularly preferably above 250° C., 500° C. or 1000° C.

Preferably, at least one of the cover layers 2, 3 is configured as a heat-resistant metal layer, preferably aluminium foil, or as a heat-resistant plastic layer, preferably polyimide foil, or as a heat-resistant woven fabric layer, preferably glass fabric foil, or as a mica layer, preferably mica paper layer.

Particularly preferably, one and/or the first cover layer 2 is configured as a heat-resistant mica layer, preferably mica paper layer, and the other and/or the second cover layer 3 is configured as a metal layer, preferably aluminium foil, or plastic layer, preferably polyimide foil. However, both cover layers 2, 3 may also be identically designed, in particular as a mica layer, preferably mica paper layer. This makes possible a particularly high heat resistance.

An embodiment of the heat insulation element 1, in which the cover layers 2, 3 are identically designed, for example each as a mica layer, is shown in particular in FIG. 1B.

According to a further embodiment, the heat insulation element 1 can have a woven fabric 21. The woven fabric 21 preferably forms an at least substantially planar and/or flat layer and/or woven fabric layer.

The term "woven fabric" refers in particular to a preferably flat product which is formed by a plurality of threads or wires crossing each other in particular at least substantially at right angles. The threads and/or wires are guided over and under transverse threads and/or wires, in particular in a certain rhythm and/or a repetitive sequence.

Preferably, the woven fabric 21 forms one or both cover layers 2, 3. However, it is also possible that the woven fabric 21 forms an additional layer 22, which is preferably provided in addition to the cover layers 2, 3. The additional layer is shown in FIG. 1C.

The woven fabric 21 is preferably a metal mesh, in particular a wire mesh made of stainless steel and/or aluminium. However, the woven fabric 21 can also be a glass fibre fabric, a carbon fibre fabric or a silicate fabric. It is also possible that the woven fabric 21 is a blended fabric and/or has or consists of a mixture of metal fibres, in particular stainless steel fibres and/or aluminium fibres, glass fibres, carbon fibres and/or silicate fibres.

The additional layer 22 is preferably arranged on the outside of the heat insulation element 1. Alternatively, the additional layer 22 can be provided inside the heat insulation element 1, for example between the cover layer 2, 3 and the fibre layer 5 and/or between the fibre layer 5 and the interlayer 6.

The cover layer 2, 3 of a woven fabric 21 is laminated and/or glued preferably to the fibre layer 5 or otherwise firmly connected to the fibre layer 5. Particularly preferably, an air-permeable and/or gas-permeable adhesive is used for connecting the woven fabric 21 forming a cover layer 2, 3 to the fibre layer 5, preferably wherein the adhesive allows gases to escape and/or pass through but forms a barrier to sparks or flames. This is particularly advantageous when using the heat insulation element 1 in a battery 8, which is described in more detail below.

Furthermore, embodiments are possible in which the heat insulation element 1 has both the additional layer 22 and the adhesive layer 7, preferably wherein in this case the adhesive layer 7 is arranged at the first cover layer 2 and the additional layer 22 is arranged at the second cover layer 3 or vice versa.

The woven fabric 21 preferably has a high heat resistance, preferably up to a temperature of about 1150° C.

The woven fabric 21, in particular metal mesh, preferably has a mesh size of at least 0.1 mm and/or at most 0.4 mm. Particularly preferred mesh sizes are, for example, about 0.114 mm, about 0.22 mm and about 0.315 mm.

The woven fabric 21, in particular metal mesh, preferably has an open screening area of at least 30% and/or at most 60%. Particularly preferred open screening areas are, for example, about 37.0%, about 42.4% and about 51%.

Preferably, at least one cover layer 2, 3 and/or the additional layer 22, in particular the woven fabric, is gas permeable.

Preferably, at least one cover layer and/or the additional layer 22, in particular the woven fabric 21, is designed in such a way that explosive, toxic and/or harmful gases are filtered and/or absorbed, for example mechanically and/or chemically, when passing through the heat insulation element 1, the cover layer 2,3 and/or the additional layer 22.

Preferably, at least one cover layer 2, 3 and/or the additional layer 22, in particular the metal mesh and/or the heat insulation element 1 as a whole, has such mechanical stability that no fragments can penetrate the heat insulation element 1 in the event of an explosion of battery 8.

The heat insulation element 1 preferably has a thickness of less than 15 mm, preferably less than 10 mm, in particular between 6 and 8 mm, in particular in the uncompressed state or delivery state.

Particularly preferably, the heat insulation element 1 and/or at least one cover layer 2, 3 and/or the interlayer 6 has a dielectric strength of more than 20 kV/mm, preferably more than 30 kV/mm, in particular of 40 to 70 kV/mm.

The cover layers 2, 3 and the intermediate ply 4 are connected to each other, in particular by gluing. In particular, a heat-resistant adhesive is used for this purpose. However, other connection techniques, such as sewing or welding, are also possible.

Preferably and/or optionally, at least one cover layer 2, 3— in the illustration example the first cover layer 2—has an adhesive layer 7, in order to attach and/or fix the heat insulation element 1 to a part of the battery 8 and/or to another heat insulation element 1 as required.

The adhesive layer 7 consists in particular of an acrylate adhesive.

The mass per unit area of the adhesive layer 7 is preferably less than 150 g/m$^2$, preferably less than 120 g/m$^2$, in particular between 50 and 100 g/m$^2$. Alternatively or additionally, adhesive layer 7 may also be in the designed as a double-sided adhesive tape.

However, adhesive layer 7 is not mandatory, but merely optional, as can be seen in particular from FIGS. 1B and 1C.

In the following, an arrangement according to the proposal and/or a use of heat insulation elements 1A and 1B according to the proposal and optionally further heat insulation elements 1C and 1D according to the proposal in battery 8 is explained in more detail on the basis of FIG. 2. The heat insulation elements 1A to 1D can be designed identically or differently in accordance with the embodiments explained above.

In the following, the heat insulation elements 1A to 1C are referred to as first heat insulation element 1A, second heat insulation element 1B, third heat insulation element 1C and fourth heat insulation element 1D for differentiation. However, this only serves to differentiate the different heat insulation elements and does not imply that, for example, if the third heat insulation element 1D is provided, a second heat insulation element 1B must also be present.

In particular, the battery 8 for power supply is arranged and/or installed in a schematically depicted vehicle 14, especially an electric vehicle. In particular, when installed, battery 8 is located below a vehicle interior 15, for example a passenger or other interior area of the vehicle 14.

The battery 8 preferably has a housing 9 with a lower housing part 10 and an upper housing part and/or housing lid 11. The housing 9 preferably consists of a non-conductive material, for example plastic, or of metal.

The battery 8 is preferably designed as a rechargeable lithium-ion accumulator. Alternatively, it can also be constructed or designed from or with lithium iron phosphate, lithium cobalt oxide, lithium metal oxide, lithium ion polymer, nickel zinc, nickel metal, nickel cadmium, nickel hydrogen, nickel silver, nickel metal hybrid and similar systems and/or materials.

In particular, the battery 8 has at least one group of battery cells 12 which are electrically interconnected and housed in housing 9, preferably in the lower housing part 10.

A first heat insulation element 1A is attached and/or fixed above the battery cells 12 and/or on the housing lid 11 of the housing 9, preferably by means of adhesive, especially by means of the adhesive layer 7.

Particularly preferably, the first heat insulation element 1A is mounted over its entire surface on an inner side 13 of the housing lid 11, the inner side 13 facing the housing interior. The first heat insulation element 1A thus closes and/or insulates the lower housing part 10 and/or the battery 8 and/or its cells 12 on the top side.

In this way, a particularly efficient top-side heat insulation and fire protection against the vehicle interior 15 is achieved, in order to protect persons or objects inside efficiently and/or long enough from uncontrolled heat development in the battery 8. A gas-tight construction also prevents and/or reduces gas explosion-like propagation in the direction of the passenger compartment.

Particularly preferably, the second cover layer 3 of the first heat insulation element 1A facing the interior of the housing and/or the battery cells 12 is designed as a mica layer, preferably a mica paper layer, the first cover layer 2 facing away from the battery cells 12 and/or the interior of the housing being designed for fastening to the housing lid 11 and in particular being provided with the adhesive layer 7. This improves the heat resistance and at the same time facilitates the handling and/or fastening of the heat insulation element 1 to the housing 9.

Alternatively or additionally, at least one (further and/or second) heat insulation element 1B is arranged between adjacent battery cells 12, in the illustration example between two groups of battery cells 12, whereby the groups are thermally insulated and/or separated from each other.

Particularly preferably, the heat insulation element 1B is inserted, pressed in or in another way placed between the battery cells 12.

In particular, the heat insulation element 1A and/or 1B encloses and/or envelops at least one battery cell 12 or a group of battery cells 12, preferably on all sides, and/or in particular in such a way that the battery cell 12 and/or group of battery cells 12 is mounted and/or arranged in a damping manner in the housing 9 via the heat insulation element 1A and/or 1B. In addition to effective, in particular all-round, heat insulation, this also enables the battery cells 12 to be mounted in a robust and/or resistant manner, since any shocks and/or vibrations are damped and/or absorbed by the compressible heat insulation element 1A and/or 1B.

In particular, the second heat insulation element 1B is attached transversely and/or perpendicularly to the inner side 13 of the housing lid 11 and/or aligned vertically, in particular in such a way that it is insertable between the battery cells 12 when the housing lid 11 is placed on the lower housing part 10.

The second heat insulation elements 1B are optionally attached and/or fastened transversely and/or vertically to the first heat insulation element 1A, for example by gluing, sewing or in any other way.

The battery 8 can have a plurality of second heat insulation elements 1B. Preferably, between several battery cells 12, in particular between all battery cells 12, second heat insulation elements 1B are arranged and/or provided. In FIG. 3, a battery 8 with several heat insulation elements 1B is shown schematically.

As an alternative or in addition to the first heat insulation element 1A and/or the second heat insulation element 1B, the battery 8 may have a further and/or third heat insulation element 1C, as shown for example in FIG. 3. The third heat insulation element 1C is preferably arranged opposite the first heat insulation element 1A and/or on an underside and/or bottom of the housing interior 13, in particular on the inner side 13 of the housing 9. Preferably, the underside and/or bottom is covered completely and/or over its entire surface by the third heat insulation element 1C.

In particular in addition to the first heat insulation element 1A, second heat insulation element 1B and/or third heat insulation element 1C, a further and/or fourth heat insulation element 1D may also be provided. Preferably, the further and/or fourth heat insulation element 1D is provided and/or arranged on one or more side walls of the inside and/or the housing 9. Preferably, the side wall(s) is/are completely covered and/or thermally insulated by the fourth heat insulation element 1D.

Preferably, in the battery 8 and/or housing 9, the woven fabric layer and/or woven fabric 21—if present—is arranged on the side of the heat insulation element 1A, 1C, 1D facing the inner side 13.

Preferably, the heat insulation elements 1A, 1C, 1D are arranged on the inner side 13 and/or in the interior of the housing 9.

The heat insulation elements 1A-1D are preferably each arranged between a battery cell 12 and/or the battery cells 12 and the housing 9.

The battery cells 12 are preferably at least substantially completely and/or on all sides enclosed and/or surrounded by one or more heat insulation elements 1A-1D.

The battery 8 and/or the housing 9 may have an outlet 23 for the escape of gases. This is shown as an example in FIG. 3.

The outlet 23 is preferably located in the housing lid 11 and/or on a top side of the battery 8 and/or housing 9. Preferably, the outlet 23 is formed by an opening penetrating the housing lid 11 and/or the heat insulation element 1A. The outlet 23 allows gases to escape from the housing 9, thus reducing the risk of explosion.

The outlet 23 may have a filter 24 for gases and/or a valve 25, in particular a one-way valve. By the valve, it can be ensured that gases can escape from the battery 8 but that no gases can enter the battery 8.

FIGS. 4 and 5 schematically show test setups and/or test arrangements for carrying out temperature measurements on heat insulation elements 1 according to the proposal.

In the tests carried out, the heat insulation function and/or heat insulation capacity of the proposed heat insulation elements 1 was investigated. For this purpose, heat was specifically introduced into the housing 9 and/or a comparable structure via a heating element 16, preferably a heating foil, in order to simulate temperature conditions comparable to those in the case of uncontrolled heat generation and/or thermal runaway. The resulting temperature diagrams and/or temperature curves are shown in FIG. 6 for a heat insulation element 1 with a first layer structure and in FIG. 7 for a heat insulation element 1 with a second layer structure.

In the test set-up shown in FIG. 4, to simulate uncontrolled heat generation and/or thermal runaway, the heating element 16 was inserted between a battery cell 12'— located at a second position starting from the heat insulation element 1— and a battery cell 12"— located at a third position starting from the heat insulation element 1— and continuously heated to a temperature above 120° C., preferably above 200° C.

At the same time, the resulting temperature curve and/or temperature rise at the heat insulation element 1 on a cold side 17 facing away from the heating element 16 on the one hand and a hot side 18 facing the heating element 16 on the other hand was measured with a measuring device, in particular a thermocouple, wherein two measurements were carried out for each layer structure.

The curves M1 and M2 in FIG. 6 show for each measurement the resulting temperature curve on the cold side 17 of the heat insulation element 1 with the first layer structure and the curves M1 and M2 in FIG. 7 show corresponding temperature curves for a heat insulation element 1 with a different and/or second layer structure.

In general, the test setup shown in FIG. 4 is intended to investigate and/or verify the heat insulation function with regard to the containment and/or delay of the transfer of thermal energy to adjacent battery cells 12 within the housing 9.

The second test setup as shown in FIG. 5 differs from the first test setup in that the temperature curve is determined on a heat insulation element 1 running on the upper side to the battery cells 12. This is intended to investigate and/or verify the heat insulation function and/or heat insulation against a room adjacent to battery 8, in particular the vehicle interior 15.

For this purpose, analogous to the first experimental setup, the heating element 16, in particular the heating foil, is arranged between adjacent battery cells 12 and heated to at least 120° C., preferably at least 200° C., to simulate uncontrolled heat generation and/or thermal runaway. The temperature progression and/or temperature rise was recorded by means of a measuring means, in particular a thermocouple, on the cold side 19 of the heat insulation element 1 remote from the heating element 16 on the one hand and on a hot side 20 of the heat insulation element 1 facing the heating element 16 on the other hand.

The curve M3 in FIG. 6 shows the resulting temperature curve on the cold side 19 of the heat insulation element 1 with the first layer structure and the curve M3 in FIG. 7 shows the resulting temperature curve for the second layer structure.

In the temperature diagram shown in FIG. 6, a heat insulation element 1 with the following first layer structure was used:

| Name/Designation | Preferred configuration | Preferred thickness |
| --- | --- | --- |
| First cover layer 2 | Aluminium foil | 50 μm |
| Fibre layer 5 | Reinforced needled nonwoven glass fibre fabric | 3 mm |
| Second cover layer 3 | Mica paper layer | 0.5 mm |
| Overall structure | | approx. 5 mm (<2 mm when installed) |

The X axis represents the time course in minutes. The axis starts with "0", which marks the starting point for switching on the heating foil 16.

The Y axis represents the temperature in ° C. The curves start at just over 20° C., which is essentially the ambient temperature.

As already mentioned, a temperature below 120° C., in particular below 80° C., should be maintained on the cold side 17 and/or 19 for as long as possible to avoid damage and/or a short circuit and/or to prevent total destruction and/or explosion of the battery 8, in particular to protect the vehicle interior 15 from the release of heat, gases and/or fragments for a sufficiently long time.

The highest temperature for all measurements was measured on curve M3 (i.e. on the cold side 19, FIG. 5) at 115.4° C. after approx. 30 min. In this case, the maximum temperature on the opposite hot side 20 was 837° C.

In curve M1 (first measurement on cold side 17, FIG. 4) a maximum temperature of 92.75° C. was reached after approx. 20 min. In this case, the maximum temperature on the opposite hot side 18 was 730° C.

In curve M2 (second measurement on cold side 17, FIG. 4) the maximum temperature of 89° C. was also reached after approx. 20 minutes. In this case, the maximum temperature on the opposite hot side 18 was 728° C.

The curves M1 and M2 deviate—as expected—only slightly from each other, as they are two measurements of the same test series (test setup FIG. 4).

A comparison of curve M3 (test setup FIG. 5) on the one hand with curves M1 and M2 (test setup FIG. 4) on the other hand initially shows that the highest temperature (115.4° C.) was measured on cold side 19. However, this temperature is only reached after more than 30 minutes—and thus significantly later than with the other curves M1 and M2. Until about 25 min after the heat is introduced, curve M3 runs clearly below the other two curves M1 and M2 and only then rises. In this respect, in particular in the first 20 to 25 minutes, efficient heat insulation on the cold side 19 and thus a high level of heat insulation against a room and/or vehicle interior 15 adjoining on the top side is made possible.

In addition, the results show that the transfer of heat and/or the thermal runaway to adjacent battery cells 12 is efficiently delayed and/or contained, as the maximum limit temperature of 120° C. is not reached in all curves M1 to M3. This eliminates or at least minimizes the risk of damage and/or short circuits.

Furthermore, the first layer structure can be realised comparatively inexpensively.

Within the framework of the second temperature diagram shown in FIG. 7, a proposed heat insulation element 1 with the following second layer structure was used:

| Name/Designation | Preferred configuration | Preferred thickness |
| --- | --- | --- |
| First cover layer 2 | Aluminium foil | 50 μm |
| Fibre layer 5 | Bonded nonwoven glass fabric | 5 mm |
| Interlayer 6 | Polyimide film | 25 μm |
| Fibre layer 5 | Reinforced nonwoven glass fabric | 5 mm |
| Second cover layer 3 | Mica paper layer | 0.2 mm |
| Overall structure | | approx. 10 mm (<3 mm when installed) |

The X axis represents the time course in minutes. The axis starts with "0", which initiates the starting point of switching on the heating foils 14 and/or 15 to initiate heat development in the corresponding groups of battery cells 12A-E (see FIG. 5).

The Y axis represents the temperature in ° C. The curves start at just over 20° C., which is essentially the ambient temperature.

The highest temperature for all measurements was determined at 76.5° C. on curve M1 (i.e. on the cold side 17 in the first measurement, FIG. 4) after 10 minutes. In this case, the maximum temperature on the opposite hot side 18 was 1300° C.

For curve M2, a maximum temperature of 75° C. was reached—in the second measurement according to FIG. 4—after 35 minutes on the cold side 17. In this case, the maximum temperature on the opposite hot side 20 was 1000° C.

For curve M3, a maximum temperature of 70° C. was reached on the cold side 19 after 55 minutes. In this case, the maximum temperature on the opposite hot side 20 was 730° C.

Consequently, the preferred maximum limit temperature of 80° C. was not reached in all cases, so that even accelerated aging of the adjacent battery cell is avoided or at least reduced.

A comparison of curve M3 (test setup FIG. 5) on the one hand with curves M1 and M2 (test setup FIG. 4) on the other shows that on the cold side 19 (curve M3) not only is the lowest maximum temperature (70° C.) present, but this maximum temperature is also present much later, after approx. 55 min. Nevertheless, the lowest temperature (730° C.) was also determined on the corresponding hot side 20.

Furthermore, it can be seen from FIG. 7 that a significant temperature increase in one of the curves M1 to M3 is only recorded after a time T of about 11 to 12 minutes.

The course explained in FIG. 6 is also confirmed in that on cold side 19, especially in the first minutes of heat input—in FIG. 7 until after approx. 45 minutes—the temperature is significantly lower than on cold side 17 (curves M1 and M2). In this respect, the heat insulation element 1 with the second layer structure makes possible a particularly effective heat insulation against adjacent rooms and/or areas, in particular the vehicle interior 15.

A comparison of the curves M1 to M3 of FIG. 7 (second layer structure) with the corresponding curves of FIG. 6 (first layer structure) also shows that a further improved heat insulation function can be achieved with the second layer structure. In particular, a reduction of the maximum temperatures was achieved, wherein the difference in the curves M3 (first layered construction: 115.4° C. compared to the second layered construction: 70.0° C.) is particularly significant. This proves the particularly advantageous use of the second layer structure as top-side heat insulation.

In general, due to the multi-layer structure of the intermediate ply 4, in particular with the polyimide layer arranged therein as interlayer 6, the second layer structure permits an optimum reduction of the heat transfer and thus a particularly efficient heat insulation function.

The polyimide layer protected by the nonwoven has retained its structure even after thermal explosion, so that the electrical insulation is maintained.

Overall, the tests show that the proposed heat insulation element 1 is suitable both for the containment of heat within battery 8 and for top-side arrangement and/or insulation, i.e. especially for thermal protection of adjacent vehicle interiors 15. The efficiency is optimal with the second layered composite, wherein the first layered composite allows a comparatively low-cost implementation with a likewise effective thermal insulation function.

The present invention also concerns the use of the proposed heat insulation element 1 on and/or in a battery 8, preferably a lithium-ion battery, in particular a traction battery for an electric vehicle.

In particular, a heat insulation element 1 is placed on top of the housing 9 to provide thermal insulation on the top side.

Alternatively or additionally, a heat insulation element 1 for thermal insulation is arranged between two adjacent battery cells 12.

In particular, the heat insulation element 1 is attached and/or fixed, preferably with adhesive, to a housing lid 11 and/or the upper part of the housing 9.

Particularly preferably, the heat insulation element 1 is mounted, especially over its entire surface, on an inner side 13 of the housing lid 11 facing the housing interior.

Preferably, the heat insulation element 1 is mounted and/or aligned transversely and/or perpendicularly to the inner side 13.

In particular, at least one first heat insulation element 1A and at least one second heat insulation element 1B are used, the first heat insulation element 1A closing and/or thermally insulating the housing interior at the top and the second heat insulation element 1B being arranged between adjacent battery cells 12A-E.

Preferably, the second heat insulation element 1B is attached to the first heat insulation element 1A, in particular transversely and/or vertically, preferably glued, needled or welded.

Individual aspects of the present invention can, as already mentioned, be combined as desired, but also realised independently of each other.

LIST OF REFERENCE NUMBERS 1 heat insulation element
1A (first) heat insulation element
1B (second) heat insulation element
1C (third) heat insulation element
1D (fourth) heat insulation element
2 first cover layer
3 second cover layer
4 intermediate ply
5 fibre layer
6 interlayer
7 adhesive layer
8 battery
9 housing
10 lower housing part
11 housing lid/upper housing part
12, 12', 12" battery cell
13 inner side
14 vehicle
15 vehicle interior
16 heating element
17 cold side vertical
18 hot side vertical
19 cold side horizontal (above the battery)
20 hot side horizontal (above the battery)
21 woven fabric
22 additional layer
23 outlet
24 filter
25 valve
M curve
T time
X axis
Y axis

The invention claimed is:

1. A traction battery for an electric vehicle comprising:
a housing, and
at least one multi-layer heat insulation element arranged in an interior of the housing and configured for thermal insulation and fire protection, wherein the heat insulation element is arranged at least one of above and between battery cells in the housing of the battery,
wherein the heat insulation element comprises:
a first cover layer and a second cover layer, wherein at least one of the first and second cover layers is a mica layer, and
a compressible and pliable intermediate ply arranged between the cover layers, which comprises at least one heat-resistant fibre layer, the fibre layer being formed from a needled nonwoven, and wherein the heat-resistant fibre layer is made of glass fibres, silicate fibres or a mixture of glass fibres and silicate fibres.

2. The battery according to claim 1, wherein the fibres of the fibre layer have a length of more than 30 mm.

3. The battery according to claim 1, wherein the fibre layer is heat-resistant above 250° C.

4. The battery according to claim 1, wherein the battery is a lithium-ion battery.

5. The battery according to claim 1, wherein the heat insulation element has a compression hardness of less than 40 kPa.

6. A traction battery for an electric vehicle comprising:
a housing, and
at least one multi-layer heat insulation element arranged in an interior of the housing configured for thermal insulation and fire protection,
wherein the heat insulation element comprises:
a first cover layer and a second cover layer, wherein at least one of the first and second cover layers is a mica layer,
a compressible and pliable intermediate ply arranged between the cover layers, which comprises at least one heat-resistant fibre layer, the fibre layer being formed from a needled nonwoven, and
wherein the fibres of the fibre layer have a length of more than 30 mm.

7. The battery according to claim 6, wherein at least one of the first and second cover layers has a dielectric strength of more than 1 kV/mm.

8. The battery according to claim 6, wherein at least one of the first and second cover layers is designed to be impermeable to water vapour, gas-tight, water-repellent and/or waterproof.

9. The battery according to claim 6, wherein the cover layers are less than 1 mm thick and/or the heat insulation element is less than 7 mm thick.

10. The battery according to claim 6, wherein at least one of the first and second cover layers is formed as a heat-resistant metal layer or aluminium foil.

11. The battery according to claim 6, wherein at least one of the first and second cover layers is formed as a heat-resistant plastic layer or polyimide film.

12. The battery according to claim 6, wherein at least one of the first and second cover layers is formed as a heat-resistant fabric layer or glass fabric foil.

13. The battery according to claim 6, wherein at least one of the first and second cover layers is formed by a woven fabric.

14. The battery according to claim 13, wherein the woven fabric is a metal mesh and/or comprises metal fibres.

15. The battery according to claim 13, wherein the woven fabric comprises glass fibres, carbon fibres and/or silicate fibres.

16. The battery according to claim 6, wherein the battery is a lithium-ion battery.

17. A traction battery for an electric vehicle, comprising:
a housing, and
at least one multi-layer heat insulation element arranged in the housing configured for thermal insulation,
the multi-layer heat insulation element being overall flexible and compressible and comprising a long-fibre, needled nonwoven as fibre layer,
wherein the multi-layer heat insulation element is arranged between adjacent battery cells and/or above battery cells in a housing of the battery for thermal insulation, the fibres of the fibre layer having a length of more than 30 mm, and
wherein the heat insulation element has a compression hardness of less than 40 kPa, and
wherein the heat-resistant fibre layer is made of glass fibres, silicate fibres or a mixture of glass fibres and silicate fibres.

18. The lithium-ion battery according to claim 17, wherein the heat insulation element is glued to a housing lid and/or housing upper part of the housing.

19. The battery according to claim 17, wherein the battery and/or the housing has an outlet for the escape of gases, wherein the heat insulation element covers the outlet.

20. The battery according to claim 6, wherein the heat insulation element has a layer of a woven fabric, wherein the woven fabric comprises or consists of at least one of glass fibres, carbon fibres, silicate fibres or a mixture thereof.

* * * * *